United States Patent [19]
Nakagawa et al.

[11] 4,359,752
[45] Nov. 16, 1982

[54] MAGNETO-FLUIDIC RECORDING APPARATUS

[75] Inventors: Masami Nakagawa, Kadoma; Wataru Shimotsuma, Ibaraki; Yoshio Kishimoto; Yoichi Sekine, both of Hirakata, all of Japan

[73] Assignee: Matsushita Electric Industrial Co., Ltd., Kadoma, Japan

[21] Appl. No.: 199,362

[22] Filed: Oct. 21, 1980

[30] Foreign Application Priority Data
Oct. 24, 1979 [JP] Japan ............................ 54-137124
Oct. 24, 1979 [JP] Japan ............................ 54-137125
Oct. 24, 1979 [JP] Japan ............................ 54-137128

[51] Int. Cl.³ ............................................. G01D 15/16
[52] U.S. Cl. ................................ 346/140 R; 346/74.2
[58] Field of Search ................... 346/140 R, 75, 74.2; 101/1, DIG. 13; 400/126

[56] References Cited
U.S. PATENT DOCUMENTS
4,258,371 3/1981 Sekine ........................... 346/140 R
4,315,267 2/1982 Sonoda ....................... 346/140 R X

*Primary Examiner*—Joseph W. Hartary
*Attorney, Agent, or Firm*—Stevens, Davis, Miller & Mosher

[57] ABSTRACT

A recording apparatus which uses magneto-fluidic material comprising a magnetic multi-stylus head arranged in parallel to oppose a recording plane, a magnet fixed to the multi-stylus head near a tip end thereof, apparatus for supplying magneto-fluidic material to at least one point of the magnet and apparatus for causing the magneto-fluidic material on the multi-stylus to selectively be flung, wherein a plurality of areas of concentration of lines of magnetic force are formed on at least one of outer surfaces of the magnet in order to stabilize the supply of the magneto-fluidic material for the comsumption of the magneto-fluidic material on the multi-stylus head due to the flying of the magneto-fluidic material.

14 Claims, 20 Drawing Figures

MAGNETO-FLUIDIC RECORDING APPARATUS

The present invention relates to an apparatus for printing characters by droplets of magneto-fluidic material.

As known methods which allow the recording of image on a plain paper, an ink jet recording method which jets ink from a nozzle and a particle transfer method which uses magnetic powder, a rotating magnetic field and an electric field have been known. In the latter method, as is disclosed in U.S. Pat. No. 3,914,771, magnetic powders are moved to a recording area by the rotating magnetic field, a tip end of a chain of powders which are linked by the magnetic force is contacted to a paper, the tip end is transferred to the paper by the electric field and then it is heated and fixed. In the former method, many improvements have been proposed and recent trend is to use magneto-fluidic material.

In regard to the character or image recording technique which uses the magneto-fluidic material, the following methods have been known. In one method, a magnet is arranged to oppose a plane of magnetic ink of magneto-fluidic material uniformly applied on a support, with a record paper being interposed therebetween, and ink is jetted to the record paper by magnetic force (Japanese Patent Publication 17746/74). In another method, magnetic ink in a nozzle is vibrated by an alternating magnetic bias in preparation for the jetting of the ink by an electric field or a magnetic field (Japanese Patent Publication 15419/76). In other method, magnetic ink in the nozzle is magnetized in an opposite polarity to a propelling magnet pole which propels the magnetic ink electromagnetically in order to assure positive recording (Japanese Patent Publication 48141/74). In still another method, the direction of the magnetic ink jetted from the nozzle is controlled by a magnetic field (U.S. Pat. No. 3,510,878).

These known methods, however, have a disadvantage that they cannot produce a high quality of recorded image in a stable manner. When the magneto-fluidic material is used, it is essential to contact the magneto-fluidic material to the record paper. As a result, an S/N ratio is lowered and the quality of recorded image is basically lowered. When the ink is used, recording is not always stable because a fine aperture at a tip end of a nozzle may be clogged by foreign material in the ink or externally applied dust or by the dryness of the ink. In the nozzle method, it is basically difficult to attain a high density of nozzle assembly and it is also difficult to control individual nozzles. When the fluidic material is jetted from the uniformly applied plane by the magnet force, a large amount of energy is required to initiate the jetting and since this energy is too much to propel the droplets, the fluidic material becomes spraylike or drizzlelike. As a result, a resolution power is reduced and hence the quality of record is lowered.

As an approach to overcome the above difficulties, the inventors of the present invention proposed (in the U.S. Patent application Ser. No. 94588 filed on Nov. 15, 1979, now U.S. Pat. No. 4,258,371) a method for producing a recorded image by using a single stylus and protruding magneto-fluidic toner by a magnet and jetting the magneto-fluidic toner from a tip end of the protuberance to a record plane in accordance with an image signal, as well as a multi-stylus recording method in which a multi-stylus head made of magnetic material is used and the protuberance of the magneto-fluidic toner is caused by a difference of magnetic forces between a stylus area of the multi-stylus head and a spacer area, and the magneto-fluidic toner is flung from the tip end of the protuberance in accordance with an image signal.

In the proposed recording method, however, it was found in subsequent researches that the quality of image and recording conditions greatly depend on the shape of the protuberence of the magneto-fluidic toner and the quality of the recorded image is significantly influenced by the shape of the protuberence and the amount of supply and the supply condition of the magneto-fluidic toner forming the protuberence. For example, under a protuberence condition in which a large amount of magneto-fluidic material is applied to the styli, the individual styli cannot be distinguished from each other and no record is produced or the quality of the recorded image is lowered. On the other hand, under a protuberence condition in which a small amount of magneto-fluidic toner is applied to the styli, the particle size of the magneto-fluidic toner jetted from the end of the protuberence is reduced and the concentration of record is reduced. In addition, since a sufficient amount of magneto-fluidic toner is not supplied to the end of the protuberence the record becomes thin or is lost. Therefore, a high quality of recorded image cannot be produced.

The present invention relates to an image recording apparatus in which magneto-fluidic toner is protruded by magnetic force on a magnetic multi-stylus head arranged to oppose a recording plane and the magneto-fluidic toner is flung or migrated to the recording plane from the protuberence of the magneto-fluidic toner in accordance with an image signal.

The recording apparatus of this type has several advantages; (i) an image of high resolution power and a high contrast is produced, (ii) no maintenance other than the supply of ink and toner is basically needed, (iii) high-speed and high density recording is attained by the multi-stylus head, (iv) self-supply of the magneto-fluidic toner is attained by magnetic force and movable mechanical parts for supplying the toner is not necessary, (v) when the magneto-fluidic toner is liquid ink of magneto-fluidic material, no fixing process is needed and it drys instantly after it is applied.

The present invention particularly relates to the magneto-fluidic recording apparatus using the above method. It makes ready and stabilizes the supply of the magneto-fluidic toner to the multi-stylus head and enables high-speed and high density of recording by the high density multi-stylus head.

More particularly, the quality of image and the recording conditions in the present recording method greatly depend on the shape of the protuberance of the magneto-fluidic toner. The higher the ruggedness or ups and downs of the protuberance is (that is, the higher the S/N ratio of the protuberance is), the higher quality of image is produced. Thus, in the present recording method, the shape of the protuberance is the most important factor. In other words, only when the shape of the protuberance of the magneto-fluidic toner has a high S/N which is desirable for flinging and recording, a clear image can be produced under readily attainable recording conditions. The present invention is directed to a shape and a structure of a magnet which accomplishes the desirable shape of the protuberance of the magneto-fluidic toner, which is a very important factor, and enables the stabilized supply of the magneto-fluidic toner. By the term "stabilized supply" herein used is meant to continuously form the protuberance (or the shape of the protuberance) which is optimum to the flinging of the magneto-fluidic toner, on the multi-stylus head.

The other features and advantages of the present invention will be apparent from the following description taken in conjunction with the accompanying drawings, in which.

The term "magneto-fluidic toner" as used herein includes (A) solid magnetic particles and (B) colloid liquid of magnetic fine particles and liquid dispersion medium. The solid magnetic particles (A) include particles which include magnetite and ferrite, and a monocomponent magnetoner for electrostatic recording belongs to them. Carbon black or other conductive agent (e.g. metal powder or macromolecular electrolyte) is added to those particles to increase the blackness and the conductivity and the particles are granulated using binding material. The colloid liquid (B) is that which is generally referred to as magneto-fluid which consists of fine particles of magnetite ($Fe_3O_4$) (having particle size of approximately 100 Å) suspended in dispersion medium together with surfactant. The liquid appears black, is stable over a long time period and neither sedimentation nor aggregation takes place therein. The dispersion medium of the magneto-fluid may be paraffin, water, ester oil or silicone oil, and the surfactant may be carbonic acid such as oleic acid or linolic acid, cation surfactant or anion surfactant. The toner (A) exhibits ferromagnetic property while the magneto-fluid (B) exhibits super paramagnetic property and exhibits no magnetic hysteresis. In the present invention, an example in which the magneto-fluid (B) is mainly used as the toner (ink) will be specifically explained.

In the present recording apparatus, the fluidic material may be flung or migrated in accordance with the image signal by (1) converting the image signal to a voltage signal to apply coulomb force, (2) applying the image signal to an electromagnet to apply magnetic force, or (3) by the combination of (1) and (2) above. In the present invention, any one of the above methods (1), (2) or (3) may be used.

The structure of the multi-stylus head used in the present invetion will now be explained in detail, and a relationship to the protuberence of the magneto-fluidic material will be explained for the case where the magneto-fluidic material (B) is used as the magneto-fluidic toner.

Figure 1:
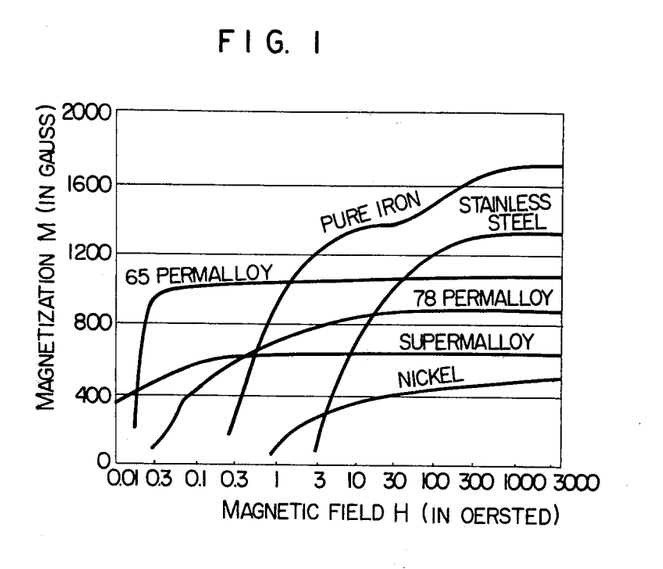
FIG. 1 is a graph showing a relationship between the strength of magnetic field and the magnetization in multi-stylus head material in accordance with the present invention.

Magnetic properties of the multi-stylus materials are shown by M-H curves in FIG. 1, where $B = H + 4\pi M$ (B: magnetic flux density, H: magnetic field) and M (in gauss) represents intrinsic magnetization of the material. The multi-stylus material used in the magnetic material shown in FIG. 1 having a higher magnetization than the magneto-fluidic toner. It may be a reed frame etched or cut from a thin plate, or a wire. The stylus may be constructed by a core material and a covering material. In this case, (a) the core material may be magnetic material, (b) the covering material may be magnetic material, or (c) the combination of (a) and (b) above may be used. When the magneto-fluidic toner is to be flung or migrated by the coulomb force in accordance with the image signal, the stylus has to be both conductive and ferromagnetic. In this case, suitable material for (a) above is a conductive wire such as iron, stainless steel or permalloy coated with macromolecular material, and suitable material for (b) above is a general purpose conductive wire such as copper or aluminum coated with resin composition having magnetic powders such as ferrite, magnetite or iron mixed therewith.

Most of the materials used for the stylus are soft magnetic materials and do not act as strong magnets by themselves. Accordingly, by combining the stylus with a magnet to magnetize it, an excellent multi-stylus head can be constructed.

Figure 2:
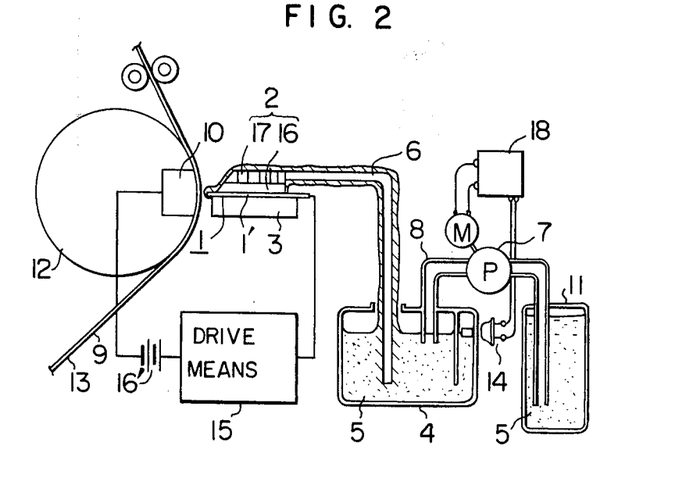
FIG. 2 shows a schematic sectional view of the construction of the magneto-fluidic recording apparatus of the present invention.

FIG. 2 shows a basic construction of the recording apparatus of the present invention which uses the multi-stylus head described above. A recording station comprises a multi-stylus head 1 having a plurality of styli 1' arranged to oppose a recording plane 9 of a recording medium 13, a protuberance magnet 2 for magnetizing the styli 1', arranged to abut against a proximity of a tip end of the multi-stylus head 1, and a base plate 3 for fixing and supporting the multi-stylus head 1. A supply magnet 6 supplies magneto-fluidic toner 5 to the recording station and it has one end thereof fixed to the protuberance magnet 2 and the other end extended into a sub-tank 4 which stores the magneto-fluidic toner 5.

The magneto-fluidic toner 5 is fed to the sub-tank 4 from a main tank 11 via a pump 7 and a pipe 8. The liquid level of the sub-tank 4 is always maintained at a fixed level by the pump 7 which is driven by a level detection signal derived from detection means 14 which may use a Hall effect element. Coupled to the multi-stylus head 1 is a drive means 15 which causes the magneto-fluidic toner 5 protruded at the tip end of the multi-stylus head 1 by the protuberance magnet 2 to be jetted or migrated to the recording plane 9 in accordance with the image signal. A bias voltage is applied from a power supply 16 across the drive means 15 and a back electrode 10.

The behavior of the magneto-fluidic toner on the multi-stylus head will now be explained briefly.

Figure 3A:
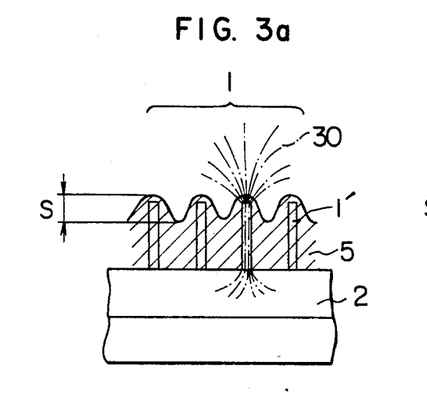
FIGS. 3a to 3d are plan views showing protuberances of the magneto-fluidic toner of the present invention.
Figure 3B:
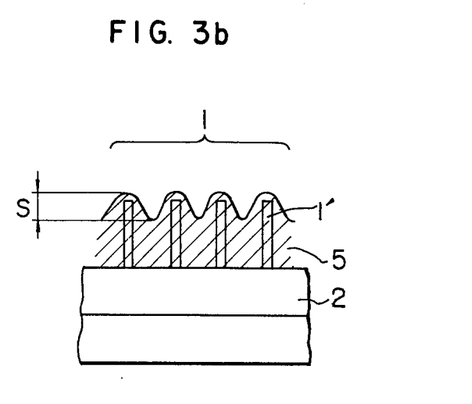

Referring to FIG. 3a, chain lines or dotted lines shown major lines of magnetic force 30 and a hatched area show the protuberances of the magneto-fluidic toner 5. As seen from FIG. 3a, the protuberances of the magneto-fluidic toner 5 are attained by establishing lines of magnetic force 30 which traverse the surface of the magneto-fluidic toner 5 perpendicularly or at an angle close thereto. The shape and the size of the protuberance change depending on the strength of the magentic force and the dimension of the styli 1'. By appropriately selecting the size and the mounting position of the protuberance magnet 2 or the dimension and the shape of the styli 1', the protuberance 1 (or the shape of the protuberance) which is optimum to the flinging can be attained. The optimum protuberance for flinging is shown in FIG. 3b in which an appropriate step s exists between the stylus area and the non-stylus area.

Figure 3C:
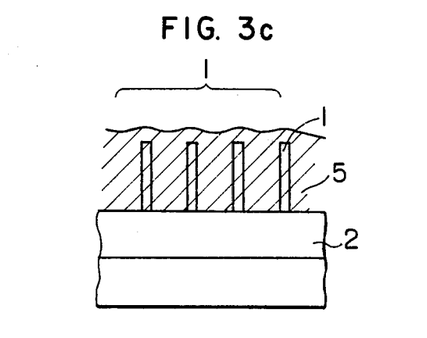

In the protuberance condition shown in FIG. 3c in which a large amount of magneto-fluidic toner 5 is deposited on the styli 1', the individual styli 1' cannot be distinguished from each other and the magneto-fluidic toner 5 does not fling at all, or when it flings, the quality of the resulting recorded image is poor. On the other hand, in the protuberance condition shown in FIG. 3d in which a small amount of magneto-fluidic toner is deposited on the styli 1', the particle size of the magneto-fluidic toner 5 jetted from the end of the protuberance is reduced and hence the concentration of the record is reduced. In addition, since the flow rate of the magneto-fluidic toner 5 to the end of the protuberance is lowered, the recorded image becomes thin or is lost.

The present invention provides the image recording apparatus which can form the optimum protuberance for flinging in a stable and continuous manner. The preferred embodiments of the present invention will now be explained in detail.

Figure 4:
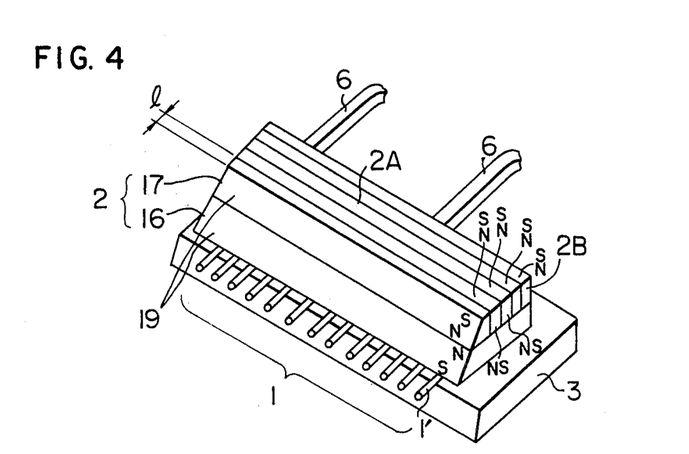
FIG. 4 is a perspective view showing a first embodiment of the present invention.
Figures 5, 6, 7:
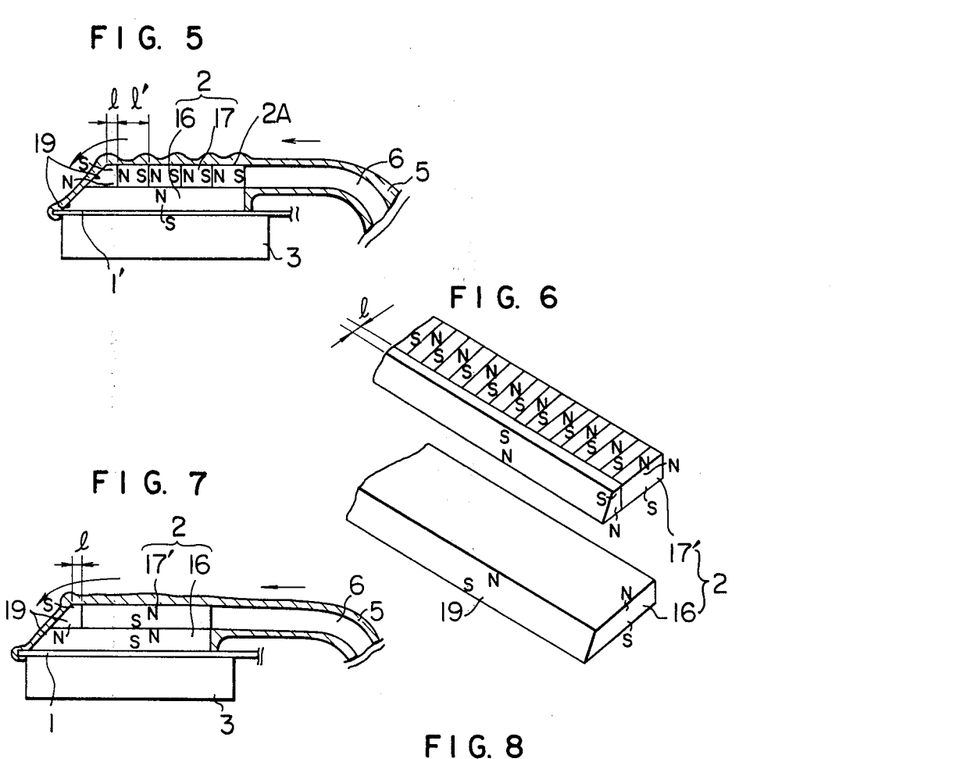
FIG. 5 shows a side elevational view thereof.
FIG. 6 is a perspective view of an equivalent modification of the first embodiment.
FIG. 7 shows a side elevational view thereof.

FIGS. 4 to 7 show a first embodiment of the present invention. FIG. 4 shows a perspective view and FIG. 5 shows a side elevational view, in which the protuberance magnet 2 arranged to abut against a proximity of the tip end of the multi-stylus head 1 comprises a protuberance magnet 16 and an auxiliary magnet 17, which is mounted on the protuberance magnet 16 and has a plurality of elongated permanent magnets joined together and extending widthwise of the styli 1'. The N-poles and the S-poles of the respective permanent magnets alternately extend in the direction parallel to the styli 1'. The thickness of the auxiliary magnet 17 is approximately one half or less of the thickness of the protuberance magnet 2. The width l of the frontmost magnetic pole is selected to a dimension (which is experimentarily determined as approximately 0.5-1.5 mm) appropriate to allow the magneto-fluidic toner 5 to flow off the end of the magnetic pole. When the width l' of the permanent magnet is made substantially equal to the width l, the fluidity of the magneto-fluidic toner 5 can be enhanced.

Since the auxiliary magnet 17 comprises a plurality of magnets joined together, small magnetic gaps exist at the junctions. Accordingly, the lines of magnetic force concentrate to the proximity of the gaps and a plurality of areas of concentration of lines of magnetic force are present on a surface 2A of the auxiliary magnet 17.

The permanent magnets used for the protuberance magnet 2 are preferably sintered metal magnets such as ferrite magnets, or "rubber magnets" or "plastic magnets" made of nitrile rubber containing barium ferrite or plastics. For the multi-stylus head 1 having a stylus density of 8 styli/mm formed by iron-nickel wire of 50 $\mu$m diameter and the magneto-fluidic toner 5 having saturation magnetization of approximately 400 gauss, the magnet having magnetic force of 300–500 oersteds may be practically used.

The supply magnets 6 for supplying the magneto-fluidic toner 5 to the protuberance magnet 2 are elongated rectangular magnets each having one end thereof fixed to the auxiliary magnet 17 and the other end extended into the sub-tank 4 which stores the magneto-fluidic toner 5. The liquid level of the sub-tank 4 is continuously maintained at a fixed level by the pump 7 which is driven by the drive means 18, in accordance with the change in the liquid level, by a level detection signal derived from the detection means 14 which may use a Hall effect element or the like so that a fixed amount of magneto-fluidic toner 5 is supplied.

A record paper 13 may be an ordinary high quality paper having the thickness of approximately 80–100 $\mu$m or it may be a plastic sheet or cloth. The back electrode 12 is arranged to abut against the record paper 13 on the back of the record paper 13.

The back electrode 12 comprises a plurality of electrode blocks 10 and a support. Coupled to the electrode blocks 10 is the drive means 15 which flings or migrates the magneto-fluidic toner 5 protruded by the protuberance magnet 2 at the end of the multi-stylus head 1 to the recording plane 9 in accordance with the image signal. A bias voltage is applied from the power supply 16 across the drive means 15 and the back electrode 12.

In the present embodiment, in order to fling the magneto-fluidic toner 5 in accordance with the image signal, the image signal is converted to a voltage signal to apply coulomb force to the protruded magneto-fluidic toner.

By utilizing the inherent characteristic of the magneto-fluidic toner 5 relating to the fact that it deposits on a magnet and flows, it is picked up from the sub-tank 4 by the supply magnet 6 and is fed to the protuberance magnet 2.

The magneto-fluidic toner 5 supplied to the protuberance magnet 2 is then fed to the multi-stylus head 1 from the auxiliary magnet 17 area of the protuberance magnet 2 through a sloped area and also it is held by the protuberance magnet 2. Since the multi-stylus head 1 is magnetized by the protuberance magnet 2, the protuberances having peaks near the end of the multi-stylus head 1 are formed in the same manner as shown in FIG. 3b. The shape of the protuberances significantly changes depending on the shape and size of the multi-stylus head 1, the size and shape of the protuberance magnet 2, and the mounting distance to the end of the multi-stylus head 1. (The variation of the mounting distance leads to the variation of the magnetic force at the end of the multi-stylus head and hence the variation of the protuberances. Accordingly, the straightness of the leading edges of the multi-stylus head 1 and the protuberance magnet 2 are important factors.) In the present embodiment, the step S of the protuberance in FIG. 3b is selected at approximately 20–50 $\mu$m.

Figure 3D:
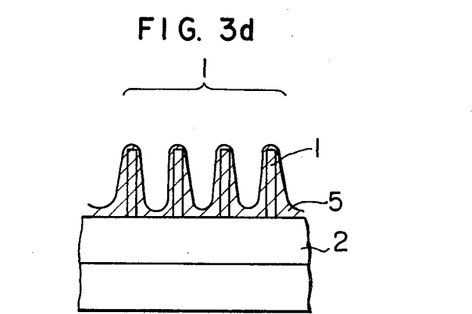

The styli 1' are made of iron-nickel wire of 50 $\mu$m diameter which is arranged at a density of 8 styli/mm. The protuberance magnet 2 is a rubber magnet made of nitrile rubber substrate having the thickness of 10–30 mm and the width of 5–10 mm containing barium ferrite, and the end surface closest to the tip ends of the styli 1' is obliquely cut at the angle of 30–60 degrees as shown in FIG. 4, for the reason which is explained below. As the angle of the protuberance magnet 2 increases from zero to 90 degrees, the magnetic force near the ends of the styli 1' increases. Accordingly, the force to protrude the magneto-fluidic toner 5 increases resulting in the protuberance condition as shown in FIG. 3c. On the other hand, when the angle is not larger than 30 degrees, the protuberance at the ends of the styli 1' assumes the protuberance condition as shown in FIG. 3d.

It has been described that the shape of the protuberance at the ends of the styli 1' changes by the shape of the protuberance magnet 2. This means that the distribution of magnetic fluxes near the ends of the styli 1' is changed by the shape of the protuberance magnet 2.

Accordingly, as shown in FIG. 4, by arranging the magnetic poles which are the same as or different from those at the end of the styli, near the end of the protuberance magnet 2, the distribution of the magnetic fluxes near the ends of the styli 1' is changed and the shape of the protuberance is changed. Thus, the optimum protuberance shape for flinging can be readily attained by changing the specification of the magnetic poles arranged on the protuberance magnet 2.

Under the conditions described above, a D.C. bias voltage of 500 volts to 2.5 kilovolts is applied between the drive means 15 and the back electrode 10 and a pulse voltage of 500–1000 volts at the frequency of 10–30 KHz is applied to the multi-stylus head 1 in accordance with the image signal so that the magneto-fluidic toner 5 is flung from the end of the multi-stylus head 1 by the coulomb force. The magneto-fluidic toner 5 flung deposits on the record plane 9 to form a desired image.

As the magneto-fluidic toner 5 is consumed, the magneto-fluidic toner 5 is supplemented or supplied to the protuberance magnet 2 by the supply magnet 6. The supplemented magneto-fluidic toner 5 passes through the magnetic pole changing area of the auxiliary magnet 17 arranged on the protuberance magnet 2 and moves to the tip end of the magnet, and then it is supplied to the multi-stylus head 1 from the tip end 19 of the sloped surface. The amount and supply rate of the magneto-fluidic toner 5 supplied to the multi-stylus head 1 must be compatible with the amount and rate of the magneto-fluidic toner 5 consumed at a high rate over the entire width of the multi-stylus head 1. In the present invention, in order to meet the above requirement, the auxiliary magnet 17 having a plurality of magnetic poles and the protuberance magnet are integrally arranged. As a result, the magneto-fluidic toner 5 supplied onto the auxiliary magnet 17 by the supply magnet 6 is strongly attracted to the areas of concentration of lines of magnetic force (magnetic pole areas in a broad sense) and rapidly moves through adjacent magnetic pole areas. Since the lines of magnetic force are ready to concentrate at the magnetic pole areas and the magnetic forces are strong at those areas, a large amount of magneto-fluidic toner 5 can be supplied and held. Accordingly, the same amount of magneto-fluidic toner 5 as that consumed by the multi-stylus head 1 can be rapidly supplied in a stable manner. (The force to cause the magneto-fluidic toner 5 to flow is created by the magnetic force. In the above case, the magneto-fluidic toner 5 on the magnet and the styli 1' is held by the constant force created by the protuberance magnet 2. Under the balanced condition of this magnetic force and the amount of magneto-fluidic toner 5 held by the magnetic force, if the magneto-fluidic toner 5 is forcibly removed by the coulomb force, the balance between the magnetic force and the amount of magneto-fluidic toner held is broken. However, a restoring force acts on the magneto-fluidic toner by a magnetic force which tends to balance out the original amount. This restoring force causes the magneto-fluidic toner to flow.)

By way of example, when the present invention is compared with a case where a single magnet is used as the protuberance magnet, the advantage of the present invention will be understood more clearly.

When a single magnet is arranged on the styli to act as the protuberance magnet, the magneto-fluidic toner does not deposit on the upper surface of the protuberance magnet because the amount of the magneto-fluidic toner 5 to be deposited on the protuberance magnet 2 is controlled to the fixed amount to assure the optimum protuberance, and in a plane-shaped or plane-like magnet the magnetic forces on the edges tend to be stronger and hence the magneto-fluidic toner is deposited on the edges of the magnet. As a result, the size of the supply path of the magneto-fluidic toner 5 to the styli 1' is restricted and a sufficient amount of magneto-fluidic toner 5 is not supplied over the entire area of the multi-stylus head.

As described above, according to the present invention, the supply of the magneto-fluidic toner to the multi-stylus head in the multi-stylus head recording method is made ready and stabilized and the high speed and high density recording by the high density multistylus head can be attained. Furthermore, by changing the magnetic pole arrangement, shape or size of the auxiliary magnet, the most desirable protuberance shape for flinging of the magneto-fluidic toner is attained. In this manner, the present invention improves the protuberance shape of the toner and the supply of the toner and enables continuous recording of clear image. The present invention may be applicable to recording apparatus such as facsimiles, printers, recorders or copiers and has a significant industrial value.

In the above explanation made in conjunction with FIGS. 4 and 5, a plurality of areas of concentration of lines of magnetic force are provided in the auxiliary magnet. It should be understood from the concept of the present invention that the magnetic pole arrangement as shown in a perspective view of FIG. 6 and a side elevational view of FIG. 7 may be used and other modifications having a plurality of magnetic poles arranged sequentially have the same effect as those of the above embodiment.

The plurality of magnetic poles may be constructed by alternately magnetizing magnet surfaces to N-poles and S-poles or by stacking a plurality of premagnetized magnets. Both methods can attain the same effect.

EMBODIMENT 2

In the previous embodiment, the auxiliary magnet having a plurality of magnetic poles is used to rapidly supply a necessary amount of magneto-fluidic toner from the protuberance magnet to the leading ends of the styli. A second embodiment shown in FIGS. 8 and 9 can also attain the same effect as the first embodiment does.

Figure 8:
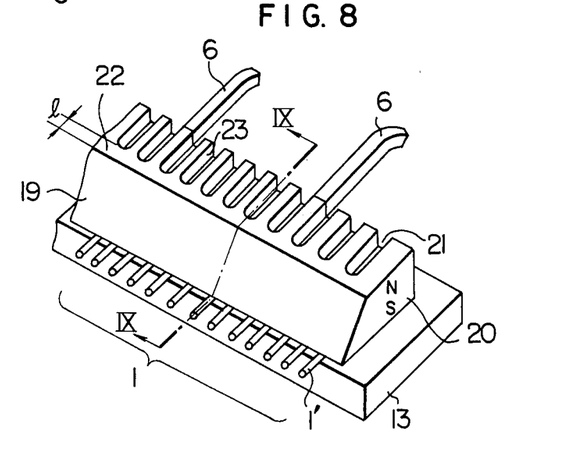
FIG. 8 is a perspective view showing a second embodiment of the present invention.

The construction of the second embodiment will now be explained. As shown in FIG. 8, grooves 21 are formed in the protuberance magnet 20 arranged to abut against a proximity of the leading end of the multi-stylus head 1. The grooves 21 are formed between the supply magnet 6 and the leading end 22 (edge) of the protuberance magnet, and extend substantially in parallel to the styli. The depth of the groove 21 may be arbitrarily determined, and in the present embodiment it is approximately one half of the thickness of the protuberance magnet. The dimension l of the edge of the protuberance magnet 20 is set to the length which allows the magneto-fluidic toner 5 to go over the edge area 22. (Experimentarily, it is approximately 0.5-1.5 mm)

When a magnet which is only plane-shaped or plane-like as shown in the first embodiment is used, the magneto-fluidic toner 5 deposits on only edge areas of the magnet. In the present embodiment, since a plurality of grooves 21 are formed in the magnet surface on which the magneto-fluidic toner 5 would otherwise hardly deposit, the lines of magnetic force concentrate to the edges of the grooves 21 (because magnetic flux density is high at the edges) so that the edge areas can flow the magneto-fluidic toner 5 faster than other areas do. Accordingly, the magneto-fluidic toner 5 flows along the edges of the grooves 21. When the size of the magnet surface is reduced, the magneto-fluidic toner 5 moves from one edge to the other edges. The dimension l described above indicates that size.

Figure 9:
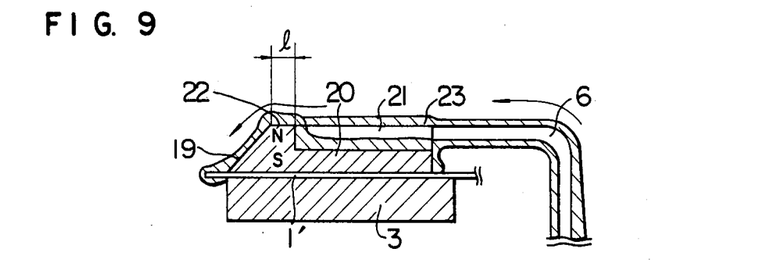
FIG. 9 shows a sectional view thereof taken along a line IX—IX in FIG. 8.

The magneto-fluidic toner 5 supplied from the supply magnet 6 passes through the edge areas 23 of the groove 21 formed in the surface of the protuberance magnet 20 as shown in FIG. 9 and it is rapidly fed from the leading end of the protuberance magnet 20 to the styli.

Figure 10:
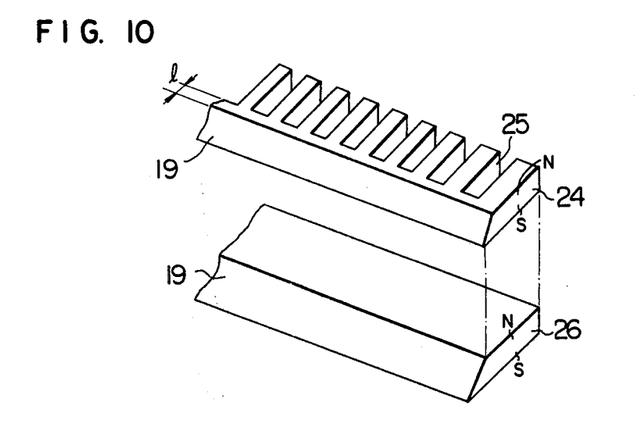
FIGS. 10 to 12 are perspective views showing the shapes of grooves and the variations thereof in the second embodiment.

FIG. 10 shows an example of method for forming the grooves in the protuberance magnet unlike the method shown in FIG. 8 in which the grooves are directly machined in the protuberance magnet 20, an auxiliary magnet 24 having comb-shaped grooves 25 is integrally mounted on the protuberance magnet 26, which has its N-pole and S-pole magnetized across its thickness as shown in FIG. 10.

Figure 11:
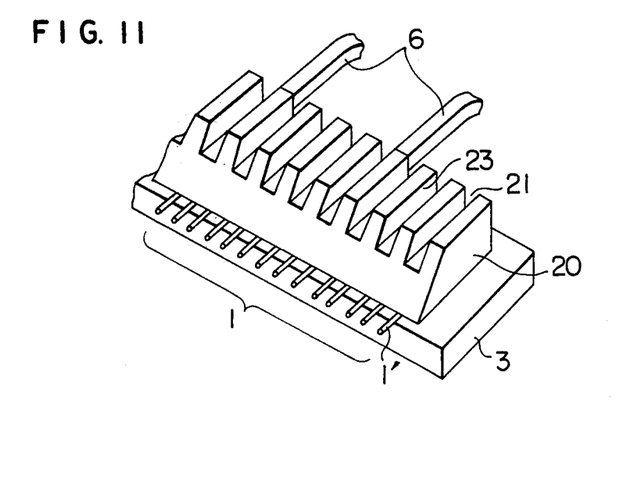
Figure 12:
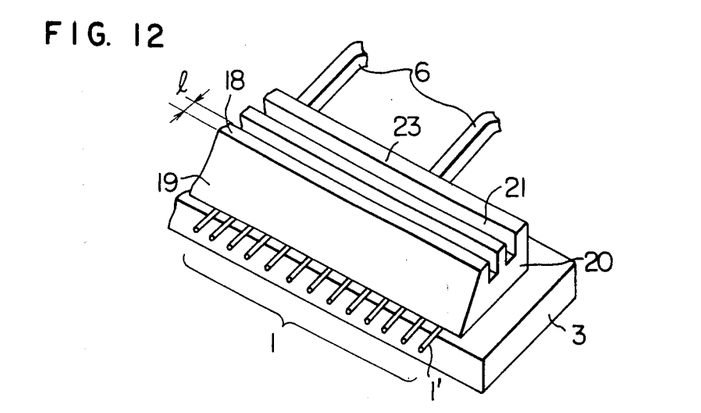

The shape of the grooves may be that shown in FIG. 11 or FIG. 12. In order to attain the concept of the present invention or improving the fluidity of the magneto-fluidic toner 5 on the magnet surface by providing the areas of concentration of lines of magnetic force, the grooves of any shape other than those shown in the drawings may be used.

In the second embodiment, the grooves are provided between the supply means for the magneto-fluidic toner and the leading end of the protuberance magnet which serves as the magnetic force source of the multi-stylus head so that a sufficient amount of magneto-fluidic toner can be supplemented with a simple structure even for a large protuberance magnet to attain high speed printing. In this manner an image recording apparatus having a high quality of print can be provided.

Figure 13:
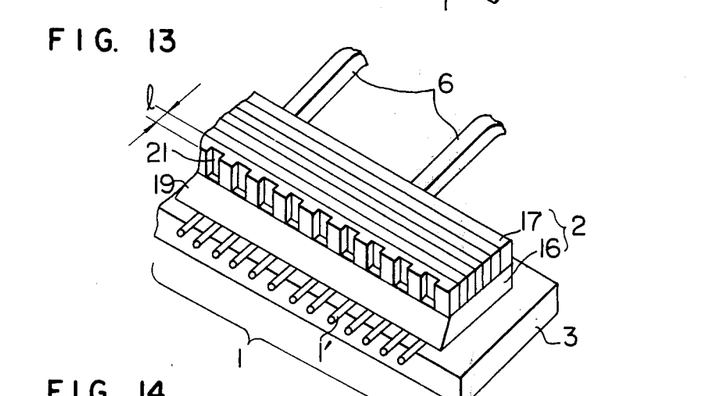
FIG. 13 is a perspective view of a combined construction of the first embodiment and the second embodiment.

FIG. 13 shows a conbination of the first embodiment and the second embodiment. It should be understood from the above explanation that the illustrated combination attains the same effect.

EMBODIMENT 3

In the first and second embodiments of the present invention, a plurality of areas of concentration of lines of magnetic force are provided to allow rapid supply of necessary amount of magneto-fluidic toner to the leading ends of the styli. In the present embodiment, the effect attained in the previous embodiments is further enhanced and the design freedom of the magnetic poles or magnetic arrangement of the protuberance magnet are increased.

Figure 14:
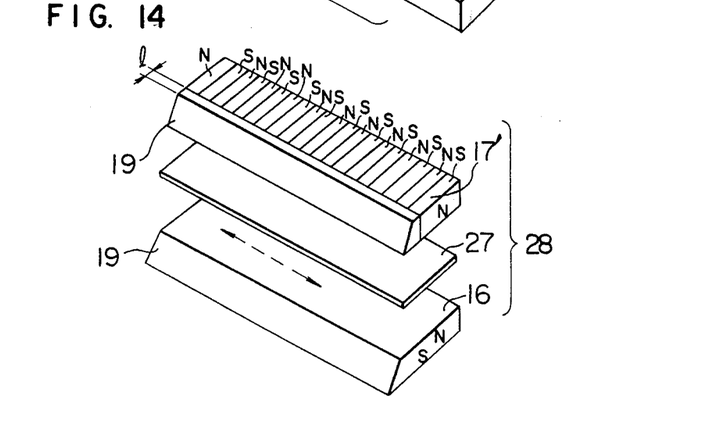
FIGS. 14 and 15 are perspective views of a third embodiment of the present invention.
Figure 15:
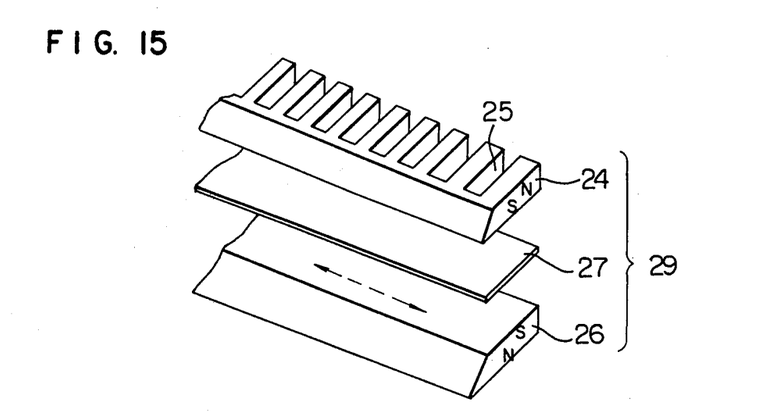

FIGS. 14 and 15 show the construction of the third embodiment of the present invention. The construction and the effect of the present embodiment will now be explained with reference to the drawings.

FIGS. 14 and 15 show protuberance magnet assemblies 28 and 29 each comprises the protuberance magnet 16 or 26, the auxiliary magnet 17' or 24 and a soft magnetic material 27 such as iron plate disposed therebetween.

Figure 16:
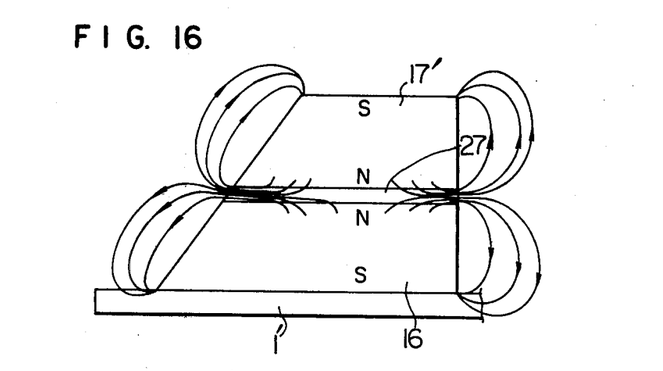
FIG. 16 is a schematic side elevational view showing the distribution of lines of magnetic force in the third embodiment.
Figure 17:
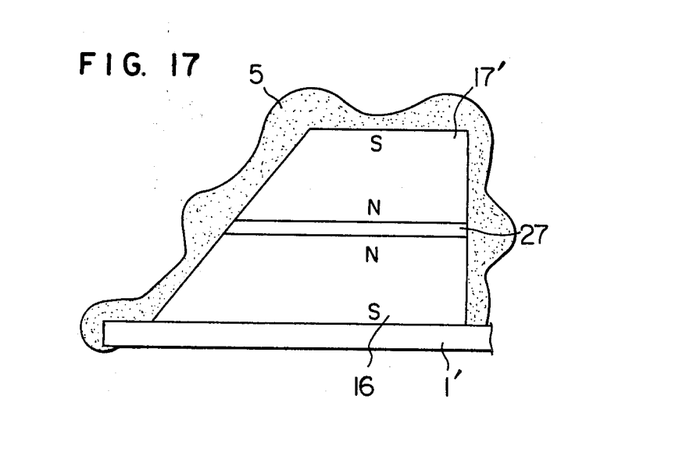
FIG. 17 is a side elevational view showing the deposition of the magneto-fluidic toner.

With this arrangement, when the magnetic poles at the junction of the protuberance magnet 16 and the auxiliary magnet 17' are of the same polarity, the lines of magnetic force flow smoothly in the direction of plane of the soft magnetic material 27 as shown in FIG. 16 so that the repelling force between the magnets 16 and 17' is significantly reduced. As a result, the bonding work is made ready and the protuberance magnet having uniform magnetic force can be produced because the nonuniformity in bonding the magnets 16 and 17' does not cause the ununiformity in the magnetic force. In the embodiment shown in FIG. 15, when the intermediate soft magnetic material 27 is made of flexible material such as rubber magnet, it is flexible in vertical direction while it is rigid in the transverse direction (direction of plane). Accordingly, the accuracy in machining the magnet is increased and the contact to the styli is enhanced by the flexibility of the flexible material. Accordingly, a highly practical protuberance magnet can be provided and a high precision multi-stylus head can be produced. The soft magnetic material used may be selected from the materials having magnetic properties shown in FIG. 1.

Furthermore, since the lines of magnetic force concentrate to the edges of the soft magnetic material 27 as shown in FIG. 16, a greater amount of magneto-fluidic toner 5 is held so that the persistency of record by the flinging or migration of the magneto-fluidic toner is enhanced.

This means that when the magneto-fluidic toner 5 is picked up from the sub-tank 4 by the bar magnet and fed to the head through the toner supply path 8 along which the protuberance magnet 28 or 29 of the present invention is arranged, the provision of the soft magnetic material 27, as shown in FIG. 14, on the protuberance magnet which makes an acute angle with one magnetic pole surface on the styli 1' allows more magneto-fluidic toner 5 to be held around the soft magnetic material so that the magneto-fluidic toner can be rapidly supplied to the leading ends of the styli 1' in response to the consumption of the toner at the leading ends of the styli 1' without disturbing the protuberance shape at the leading ends of the styli 1'. The amount of toner held can be controlled by changing the thickness of the soft magnetic material 27. The soft magnetic material 27 provides the advantages of enhancing the machining accuracy while maintaining the flexibility accuracy while maintaining the flexibility of the magnet, increasing the amount of toner held and allowing rapid supply of the toner in the direction of broken line arrow shown in FIG. 14 by the movement of the toner by the magnetic force along the edges of the soft magnetic material.

What is claimed is:

1. A magneto-fluidic recording apparatus comprising:
    a magnetic multi-stylus head arranged parallel to and opposed to a recording plane having a first end proximal to a recording plane;

supply means for supplying magneto-fluidic material from a magneto-fluidic material source to said multi-stylus head, a magnet having at least one supply surface for receiving a supply of magneto-fluidic material from said supply means, said magnet being arranged on said multi-stylus head near said first end of said multi-stylus head, means for selectively flinging magneto-fluidic material on said multi-stylus head onto a recording plane, and at least three magnetic poles providing concentrated lines of magnetic force arranged continuously on said supply surface of said magnet.

2. The magneto-fluidic recording apparatus of claim 1, wherein at least three edge portions where the lines of magnetic force are made to concentrate are arranged continuously on said supply surface.

3. The magneto-fluidic recording apparatus according to claim 1, wherein said magnet has an outer surface between said supply surface and said multi-stylus head and at least one groove on said outer surface.

4. A magneto-fluidic recording aparatus comprising:
a magnetic multi-stylus head arranged parallel to and opposed to a recording plane having a first end proximal to a recording plane;

supply means for supplying magneto-fluidic material from a magneto-fluidic material source to said multi-stylus head;

a magnet having at least one supply surface for receiving a supply of magneto-fluidic material from said supply means said magnet being arranged on said multi-stylus head near said first end of said multi-stylus head;

means for selectively flinging magneto-fluidic material on said multi-stylus head onto a recording plane; and at least three edge portions where the lines of magnetic force are made to concentrate arranged continuously on said supply surface of said magnet.

5. A magneto-fluidic recording apparatus comprising:
a magnetic multi-stylus head arranged parallel to and opposed to a recording plane having a first end proximal to a recording plane;

supply means for supplying magneto-fluidic material from a magneto-fluidic material source to said multi-stylus head;

a magnet having at least one supply surface for receiving a supply of magneto-fluidic material from said supply means, said magnet being arranged on said multi-stylus head near said first end of said multi-stylus head;

means for selectively flinging magneto-fluidic material on said multi-stylus head onto a recording plane; and at least three magnetic poles providing concentrated lines of magnetic force are arranged continuously on an outer surface of said magnet between said supply surface and said multi-stylus head.

6. The magneto-fluidic recording apparatus of claim 5, wherein at least three edge portions where the lines of magnetic force are made to concentrate are arranged on said outer surface.

7. The magneto-fluidic recording apparatus of claim 5, wherein said at least three magnetic poles are constructed by stacking a plurality of magnets.

8. The magneto-fluidic recording apparatus of claim 5, wherein said plurality of magnetic poles on said magnet are constructed by stacking a plurality of magnetic elements and soft magnetic material alternately.

9. A magneto-fluidic recording apparatus comprising:
a magnetic multi-stylus head arranged parallel to and opposed to a recording plane having a first end proximal to a recording plane;

supply means for supplying magneto-fluidic material from a magneto-fluidic material source to said multi-stylus head;

a magnet having at least one supply surface for receiving a supply of magneto-fluidic material from said supply means, said magnet being arranged on said multi-stylus head near said first end of said multi-stylus head;

means for selectively flinging magneto-fluidic material on said multi-stylus head onto a recording plane; and at least three edge portions where the lines of magnetic force are made to concentrate arranged continuously on an outer surface of said magnet between said supply surface and said multi-stylus head.

10. The magneto-fluidic recording apparatus of claim 9, wherein said magnet has at least one groove on said outer surface.

11. A magneto-fluidic recording apparatus for recording images or characters on a recording surface comprising:

means for supplying magneto-fluid material;

means forming a base;

stylus means for forming protuberances of the magneto-fluidic material positioned on said base means and arranged parallel to and across from a recording plane;

magnetic protuberance means adjacent said stylus means for magnetically causing protuberances of the magneto-fluidic material to form on said stylus means;

at least one electrode positioned behind a recording surface;

drive means electrically connected to said at least one electrode and said stylus means for electrically and selectively projecting magneto-fluidic material from said stylus means onto a recording plane;

supply magnetic means for supplying magneto-fluidic material from said supplying means to said magnetic protuberance means, said supply magnetic means being located adjacent said magnetic protuberance means and comprising means forming a surface onto which the magneto-fluidic material flows, said surface means comprising boundary edges generally located within a plane and defining a generally planar surface and a plurality of edge portions located within the confines of said boundary edges which create areas of concentration of the magnetic lines of force;

whereby the supply of magneto-fluidic material from said supply means for transfer onto said stylus means for ultimate projection onto a recording surface is enhanced by the provision of a plurality of edge portions on said surface means of said supply magnetic means as the magneto-fluidic material is strongly attracted to the areas of concentration of the magnetic force created by said edge portions so that a large amount of magneto-fluidic material can be supplied and held in a stable manner.

12. The magneto-fluidic recording apparatus of claim 11 wherein said surface means further comprises a plurality of grooves located between said edge portions.

13. A magneto-fluidic recording apparatus for recording images or characters on a recording surface comprising:
 means for supplying magneto-fluidic material;
 means forming a base;
 stylus means for forming protuberances of the magneto-fluidic material positioned on said base means and arranged parallel to and across from a recording plane;
 magnetic protuberance means adjacent said stylus means for magnetically causing protuberances of the magneto-fluidic material to form on said stylus means;
 at least one electrode positioned behind a recording surface;
 drive means electrically connected to said at least one electrode and said stylus means for electrically and selectively projecting magneto-fluidic material from said stylus means onto a recording plane;
 supply magnetic means for supplying magneto-fluidic material from said supplying means to said magnetic protuberance means, said supply magnetic means being located adjacent said magnetic protuberance means and comprising a plurality of magnetic segments each having a plurality of magnetic poles which create areas of concentration of the magnetic lines of force;
 whereby the supply of magneto-fluidic material from said supply means for transfer onto said stylus means is enhanced by the areas of concentration of magnetic force created by said plurality of magnetic segments so that a large amount of magneto-fluidic material can be supplied and held in a stable manner.

14. The magneto-fluidic recording apparatus of claim 13 wherein said plurality of magnetic segments are formed by arranging a plurality of magnets adjacent to each other.

* * * * *